United States Patent [19]

Aizawa et al.

[11] 4,268,152
[45] May 19, 1981

[54] BULB PHOTOGRAPHY CONTROL SYSTEM FOR CAMERA

[75] Inventors: Hiroshi Aizawa, Kawasaki; Masanori Uchidoi; Kazunobu Urushibara, both of Yokohama; Nobuyuki Suzuki; Masami Shimizu, both of Tokyo, all of Japan

[73] Assignee: Canon Kabushiki Kaisha, Tokyo, Japan

[21] Appl. No.: 107,552

[22] Filed: Dec. 27, 1979

[30] Foreign Application Priority Data

Dec. 28, 1978 [JP] Japan .................................. 53/165846

[51] Int. Cl.³ .......................... G03B 7/08; G03B 9/34; G03B 9/08
[52] U.S. Cl. ................................ 354/234; 354/60 R; 354/242
[58] Field of Search ...................... 354/50, 51, 60, 235, 354/241–244, 234

[56] References Cited

U.S. PATENT DOCUMENTS

| | | | |
|---|---|---|---|
| 3,303,766 | 2/1967 | Karikawa et al. | 354/50 |
| 3,504,601 | 4/1970 | Schubert | 354/51 |
| 3,821,757 | 6/1974 | Kobori | 354/244 X |
| 3,911,449 | 10/1975 | Watanabe | 354/60 R X |
| 3,990,089 | 11/1976 | Urano | 354/242 |
| 4,024,553 | 5/1977 | Maitani et al. | 354/242 |

*Primary Examiner*—Donald A. Griffin
*Attorney, Agent, or Firm*—Toren, McGeady and Stanger

[57] ABSTRACT

A control system for a camera controls a shutter release operation electromagnetically. A signal generating circuit produces a switching signal for operating a switching circuit which supplies current to a control circuit for a camera. The signal generating circuit is in a condition to always produce a switching signal when a camera operation member is set to normal photographing modes other than the bulb photographing mode, and is out of condition to produce the switching signal during the time between actuation of a magnet and termination of the shutter opening operation. The closing operation of the shutter is checked by means of a mechanical control member during the release when the camera operation member is set in the bulb photographing mode.

6 Claims, 4 Drawing Figures

BULB PHOTOGRAPHY CONTROL SYSTEM FOR CAMERA

BACKGROUND OF THE INVENTION

1. Field of the Invention

The present invention relates to a bulb photography control system for a camera for electrically acutating the camera and mechanically operating the shutter closing.

2. Description of the Prior Art

Until now, electronic shutter cameras having an electromagnetic release device for electromagnetically actuating the camera have utilized two systems for carrying out bulb photography, namely one for carrying out bulb photography electrically and another system for carrying out the bulb photography mechanically.

In the first system, for carrying out the bulb photography electrically actuation of the electromagnetic release device is accompanied by the aperture control mechanism and the quick return mirror control mechanism starting to operate, while, at the same time the tail or trailing shutter curtain holding magnet is brought into a hold state. When the aperture or the quick return mirror control mechanism has operated, the leading shutter curtain is made to start to run so as to start the exposure while the shutter is kept open. Then, along with the release operation of the release button the tail shutter curtain is made to run so as to terminate the exposure. When the tail shutter curtain runs or has run, the current supply to the control circuit of the camera is interrupted so as to bring the camera into the rest state.

In the second system for carrying out bulb photography mechanically, during the bulb photographing mode, the circuit and the mechanism are changed over in such a manner that instead of an electromagnetic release device, a mechanical release mechanism is used. The shutter is kept open by means of a mechanical tail shutter curtain holding mechanism operatively engaged with the release button. Along with the release operation of the release button the holding mechanism is released so as to allow the tail shutter curtain to start to run and terminate the photographing operation. Hereby, the changeover of the circuit is generally intended to interrupt the current supply to the control circuit of the camera.

However, in the first system for electrically carrying out bulb photography, the current runs through the tail shutter curtain holding magnet and its control circuit for the whole time during which bulb photography is carried out so that battery consumption is substantially increased. This increase is all the more considerable in case of a long time exposure, for example microscopic photography, close up photography, celestial body photography and so on. Further, when the above mentioned photography is carried out under low temperatures, the efficiency of the battery lowers, which makes operation all the more disadvantageous.

In the second system for mechanically carrying out bulb photography the electromagnetic and mechanical release mechanisms, and their change over mechanism, are necessary so that not only the construction inside of the camera which is spatially restricted becomes quite complicated so as to raise the manufacturing cost but also there is a difference between the feel of operation depending on whether the electromagnetic release or the mechanical release is used, which is disadvantageous.

SUMMARY OF THE INVENTION

An object of the present invention is to eliminate the above mentioned shortcomings in such a manner that when a camera's release operation is made electromagnetically and its shutter is electrically controlled, the release operation of the camera during bulb photography is made electromagnetically by means of a magnet, so that the current supplied to the control circuit is interrupted during the time between actuation of the magnet until termination of the shutter opening operation, while the shutter closing operation is mechanically checked by means of a control member during the release operation.

Another object of the present invention is to disable the display operation when the bulb photographic mode is set.

DESCRIPTION OF THE PREFERRED EMBODIMENTS

Below the present invention will be explained in accordance with the embodiment of the present invention.

Figure 1:
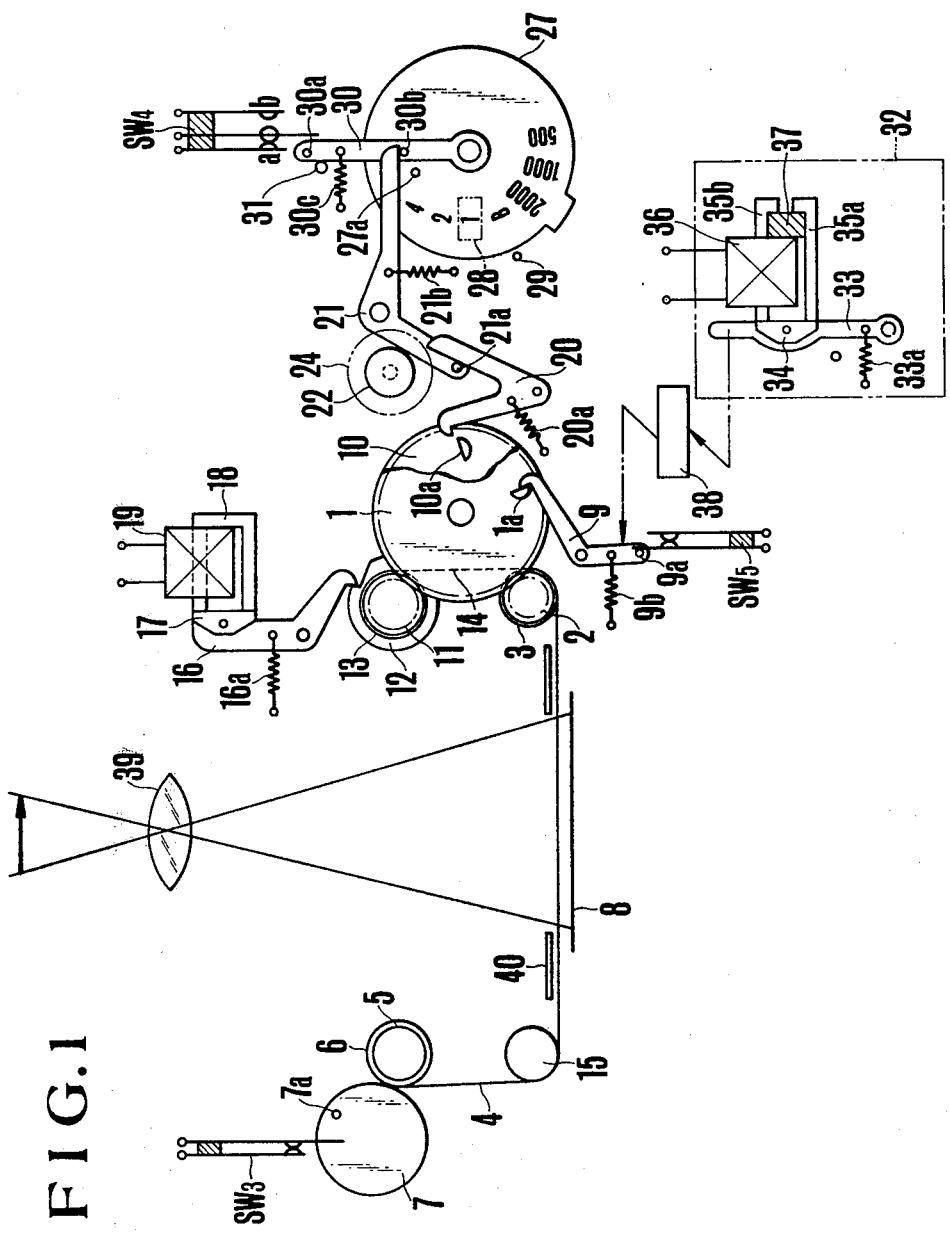
FIG. 1 is a schematic representation of a shutter control arrangement inside a camera according to an embodiment of the present invention.
Figure 2:
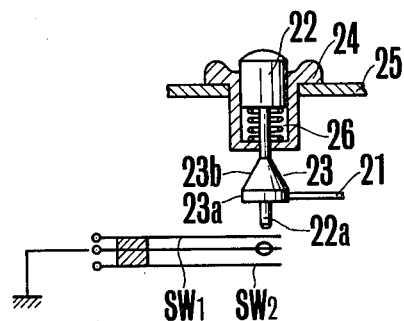
FIG. 2 shows a release button and associated switches shown in FIG. 1 in detail.

FIG. 1 shows a shutter control arrangement inside a camera, the arrangement having been wound. A master gear 1 of a leading shutter curtain 4 is provided with a pin 1a. A leading shutter curtain pinion gear 2 engaged with the leading shutter curtain master gear and a leading shutter curtain drum 3 is secured coaxially with the pinion gear 2, whereby on the drum 3, the leading shutter curtain whose one end is secured on the drum 3 is wound. A leading shutter curtain wind up drum 5 and a gear 6 is secured on the wind up drum, whereby the gear 6 is engaged with a gear 7 on which an operation pin 7a for the switch SW3 is provided. A leading shutter curtain tension lever 9 engaged with the pin 1a provided on the leading shutter curtain master gear 1, whereby the lever 9 is provided with an operation pin 9a for a switch SW5 and urged along the counterclockwise direction by means of a spring 9b. A tail shutter curtain master gear 10 provided separately from but coaxially with the leading shutter curtain master gear 1, has the tail shutter curtain master gear 10 provided with a pin 10a. Further, the tail shutter curtain master gear 10 is engaged with a tail shutter curtain pinion gear 11. With the tail shutter curtain pinion gear 11, a tail shutter curtain holding plate 12 is coaxially provided. A tail shutter curtain drum 13 secured coaxially with the tail shutter curtain pinion 11, whereby on the drum 13, the tail shutter curtain 14 whose one end is secured on the drum 13 is wound. 15 is a tail shutter curtain winding up drum. A tail shutter curtain tension lever 16 stops the tail shutter curtain holding plate 12, whereby the lever 16 is urged by means of a spring 16a along the counterclockwise direction. This tail shutter curtain tension lever 16 is provided with an armature 17 of a tail shutter curtain control magnet, whereby the armature 17 is in a position to be attracted by a yoke 18. An exciting coil 19 provided on the yoke 18. A bulb engaging lever to be engaged with the pin 10a of the tail shutter curtain master gear 10 is urged by means of a spring 20a along the counterclockwise direction. Numeral 21 is a bulb control lever on whose one end a pin 21a is provided, in such a manner that the lever 21 is engaged with the engaging lever 20 through the pin 21a, whereby the lever 21 is urged by means of the spring 21b along the clockwise direction. One side of the lever 21 is to be brought into contact with a cylindrical surface 23a or an inclined surface 23b of a bulb control member 23 provided on the shaft 22a of a release button 22 as shown in FIG. 2. The end of the shaft 22a of the release button 22 is intended for operating switches SW1 and SW2. Numeral 24 is the guide for the release button 22, whereby the guide 24 is provided at a corresponding position on the exterior part 25 of the camera. Numeral 26 is a spring for urging the release button 22 upwards. Numeral 27 (FIG. 1) is a shutter time dial on which shutter time values are arranged as is shown, whereby the set shutter time value is displayed in a window 28. Numeral 29 is a pin for restricting the range of rotation of the shutter time dial. Numeral 30 is a lever provided separately from but coaxially pivoted with the dial 27, whereby the lever 30 is provided with pins 30a and 30b in such a manner that a switch SW4 can be changed over by means of the pin 30a while the other end of the lever 21 is in abutment with the pin 30b. The lever 30 is urged by means of a spring 30c along the counterclockwise direction. Numeral 31 is a pin for limiting the rotation range of the lever 30. Further, the lever 30 is rotated along the clockwise direction against the strength of the spring 30c by means of the pin 27a provided on the shutter time dial 27 when the bulb photographing mode is set. Numeral 32 is an electromagnetic release device consisting of an armature 34 provided on a lever 33, yokes 35a and 35b attract the armature 34, a permanent magnet 37 sandwiched between the yokes 35a and 35b and an exciting coil 36 is provided on the yoke 35b. The lever 33 is urged along the counterclockwise direction by means of a spring 33a, whereby the operation of the lever 33 is transmitted to the leading curtain tension lever 9 directly or through a conventional mechanism 38 as is shown in the drawing. Numeral 39 is a photographing lens, while 40 is a member for forming a lens aperture.

Figure 3:
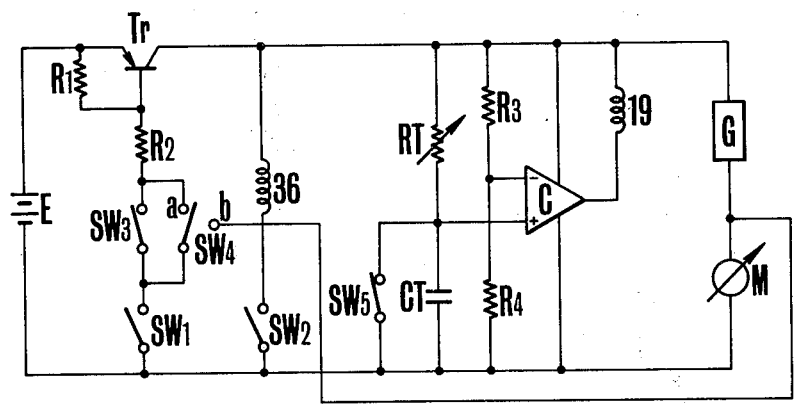
FIG. 3 is a schematic diagram of an electric control circuit for the arrangement shown in FIGS. 1 and 2.

FIG. 3 shows a control circuit for the arrangement shown in FIGS. 1 and 2. Hereby, SW1–SW5 are the switches shown in FIGS. 1 and 2, while 19 and 36 are respectively the exciting coils for the magnets.

E is the power source battery being connected in parallel with an electromagnetic release circuit, a shutter control circuit and a display circuit through a switching transistor Tr. Between the base of the transistor Tr and the power source E, the switches SW1 and SW3 and the resistance R2 are connected in series so as to produce a switching signal for bringing the transistor Tr into the switched on state. With the switch SW3, the change over switch SW4 is connected in parallel so as to bring the transistor Tr into the switched on state when the movable contact piece of the switch SW4 is connected to the fixed contact point a. R1 is the bias resistance for the transistor Tr. The electromagnetic release circuit consists of the exciting coil 36 for the electromagnetic release magnet and the switch SW2 connected in series with each other. The shutter control circuit includes a comparator to whose first input terminal the voltage dividing point of the resistances R3 and R4 is connected and to whose second input terminal is coupled the connecting point of a variable resistance RT and the condenser CT constituting a shutter time control time constant circuit. The exciting coil 19 of the shutter control magnet is connected to the output terminal of the comparator C. Further, with the capacitor CT the count switch SW5 is connected in parallel. The display circuit consists of the light sensing element or the light measuring circuit G and the display meter M connected in series with each other.

The operation of the above construction will now be explained. First of all, normal photography other than bulb photography will be explained.

Initially, the camera is in the wound up state, so that the switch SW3 is in the closed state. The shutter time dial 27 is set at a photographing mode other than the bulb photographing mode B so that the movable contact piece of the change over switch SW4 is connected to the fixed contact point a, while the lever 21 is in abutment with the pin 30b of the lever 30. The variable resistance RT is set at the resistance value corresponding to the shutter time to be set. When the release button 22 is pushed down in this state, the switch SW1 is closed so as to bring the transistor Tr into the switched on state and start the current supply to the circuits. At this time the exposure information can be checked by means of the meter M if necessary. When the release button 22 is further pushed down, the switch SW2 is closed so as to supply current to the exciting coil 36. At this time, along with the pushing down of the release button 22 the inclined surface 23b of the control member 23 is also lowered, while the lever 21, which is held by means of the pin 30b, is not rotated. Thus, the bulb control lever 20 is not engaged with the pin 10a of the tail shutter curtain master gear 10. Along with the current supply to the exciting coil 36, the magnetic flux of the coil 36 is compensated with that of the permanent magnet 37 so that the yokes 35a and 35b do not attract the armature any more, whereby the lever 33 is rotated along the counterclockwise direction by means of the spring 33a. This operation is transmitted to the leading shutter curtain tension lever 9 directly or through the conventional mechanism 38 so as to disengage the lever 9 from the pin 1a. Thus, the leading shutter curtain master gear 1 and the pinion gear 2 are rotated so as to operate the leading shutter curtain drum 3 and the leading shutter curtain winding up drum 5 in such a manner that the leading shutter curtain 4 starts to run. At the same time the switch SW5 is opened so as to start charging of capacitor CT through the resistance RT. On the other hand, the rotation of the leading shutter curtain winding up drum 5 is transmitted to the gear 7 through the gear 6, and toward the end of the rotation range the switch SW3 is opened by means of the pin 7a, whereby because the movable contact piece of the switch SW4 connected in parallel with the switch SW3 is changed over to the fixed contact point a, the current is continued to be supplied to the circuits. After the lapse of the time determined by means of the capacitor CT and the resistance RT the output of the comparator C is inverted so as to interrupt the current supply to the exciting coil 19. Thus, the yoke 18 does not attract the armature 17 any more so that the lever 16 is rotated along the counterclockwise direction by means of the spring 16a so as to be disengaged from the tail shutter curtain holding plate 12. Thus, the tail shutter curtain pinion gear 11 as well as the tail shutter curtain master gear 10 are rotated so as to operate the tail shutter curtain drum 13 and the tail shutter curtain winding up drum 15, whereby the tail shutter curtain 14 starts to run and terminates the exposure.

The bulb photography mode will now be explained.

At first, the camera is in the wound up state, so that the switch SW3 is closed. The shutter time dial 27 has been set at the bulb photographing mode B so that the lever 30 is rotated by means of the pin 27a along the clockwise direction so as to connect the movable contact piece of the change over switch SW4 to the fixed contact point b and make the display by means of the meter M impossible, while the lever 21 is disengaged from the pin 30b of the lever 30. Thus, the position of the lever 21 is restricted in accordance with the control member 23 operatively engaged with the release button 22. At this time, the resistance RT is set at a resistance value corresponding to a comparatively high shutter speed, for example, 1/125 sec. by correspondingly selecting the bulb position in the shutter time dial. When the release button 22 is pushed down in this state, at first the switch SW1 is closed, so as to bring the transistor Tr into the switched on state and start the current supply to the circuits. At this time the lever 21 rotates, following the inclined surface 23b of the control member 23 so that the lever 20 is engaged with the pin 10a of the tail shutter curtain master gear 10 so as to prevent the tail shutter curtain 14 from starting. When the release button 22 is further pushed down, the switch SW2 is closed so as to supply current to the exciting coil 36. Along with the current supply to the exciting coil 36 the magnetic flux of the coil 36 is compensated with that of the permanent magnet 37 in such a manner that the yokes 35a and 35b do not attract the armature 34 any more and the lever 33 is rotated by means of the spring 33a along the counterclockwise direction. This operation is transmitted to the leading shutter curtain tension lever 9 directly or through the conventional mechanism 38 in such a manner that the lever 9 is disengaged from the pin 1a. Thus, the leading shutter curtain master gear 1 as well as the pinion gear 2 are rotated so as to operate the leading shutter curtain drum 3 and the leading shutter curtain winding up drum 5 in order to allow the leading shutter curtain to start to run. On the other hand, the rotation of the leading shutter curtain winding up drum 5 is transmitted to the gear 7 through the gear 6 and toward the end of the rotation range the switch SW3 is opened by means of the pin 7a. The movable contact piece of the switch SW4 which is connected in parallel with the switch SW3 has also changed over to the fixed contact point b, so that the transistor Tr is brought into the switched off state so as to interrupt the current supply to the circuit. During this time along with the running of the leading shutter curtain 4 the switch SW5 is opened so as to supply current to the exciting coil 19 in accordance with the value set at the resistance RT, whereby when the shutter control magnet is actuated the pin 10a on the tail shutter curtain master gear 10 is engaged with the lever 20, so that the tail shutter curtain 14 does not start to run and the shutter is kept in the opened state. When the release button 22 is freed after the lapse of a desired exposure time, the lever 21 follows the inclined surface 23b of the control member 23 and is thereby rotated into its initial position. Consequently, the lever 20 is rotated along the clockwise direction so as to be disengaged from the pin 10a of the tail shutter curtain master gear 10, whereby the rotation of the tail shutter curtain master gear 10 becomes possible. Thus, the tail shutter curtain pinion gear 11 as well the tail shutter curtain master gear 10 are rotated so as to operate the tail shutter curtain drum 13 and the tail shutter curtain winding up drum 15 and allow the tail shutter curtain to start to run in order to terminate the exposure.

It is necessary that the tail shutter curtain tension lever 16 be operatively engaged with the winding up operation of the camera so as to mechanically hold the armature 17 in an attracted state and that the mechanical holding of the armature be released after the current supply to the exciting coil 19 is started in accordance with the operation of the release button 22. This problem can be solved by means of conventional techniques so that a detailed explanation of a suitable arrangement and its operation is omitted. Also, other parts can be wound up by conventional means so that further explanation is also omitted.

Figure 4:
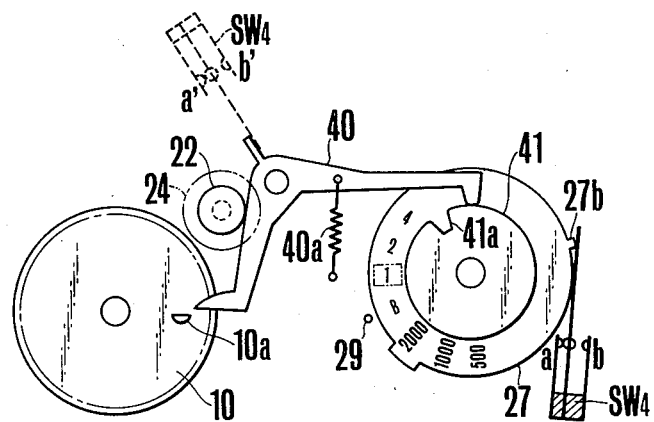
FIG. 4 shows a modification of a portion of the arrangement shown in FIG. 1.

In case of the above mentioned embodiments the change over of the switch SW4 is controlled by means of the lever 30 provided separately from but coaxially pivoted with the dial 27, however, the present invention is not limited to this arrangement but can be embodied in such a manner that the change over of the switch SW4 is controlled by means of a projection 27b provided on the dial as is shown in FIG. 4. Then, the operation of the tail shutter curtain is carried out as follows. Namely, the control lever 40 engaged with the pin 10a of the tail shutter curtain master gear 10 is urged along the clockwise direction by means of the spring 40a, whereby the rotation of the control lever 40 is prevented by means of the cylindrical surface 23a of the release button 22 and the notched disc 41 provided coaxially with the dial. Thus, when the dial 27 is set at the bulb position, it becomes possible for the one end of the control lever 40 to enter into the notch 41a in the disc 41, whereby by operating the release button 22 the control lever 40 is rotated along the clockwise direction by means of the spring 40a in such a manner that the other end holds and abuts the pin 10a of the tail shutter curtain master gear 10. The release button, which has been freed, is raised upwards and the control lever 40 is rotated along the counterclockwise direction against the strength of the spring 40a by means of the inclined surface 23b until the other end is disengaged from the pin 10a so as to allow the tail shutter curtain master gear 10 to rotate. At this time, the one end of the control lever 40 is brought out of the notch 41a of the disc 41 so that a setting operation of the dial 27 becomes possible.

In FIGS. 1 and 4, the change over of the switch SW4 is controlled in accordance with the operation of the dial 27, whereby the change over switch SW4 can be changed over by means of the control lever 40 as is shown in the dotted line in FIG. 4 when the display is to be disabled.

As is explained above in detail in accordance with the present invention in the bulb photographing mode the release operation of the camera is carried out electromagnetically by means of a magnet, the current supply to the control circuit for the camera is interrupted during the time from the actuation of the magnet till the termination of the shutter opening operation, and the shutter closing operation is checked mechanically by means of a control member during the release operation in such a manner that the consumption of the battery is prevented, while at the same time the construction can be much simplified because it is not necessary to provide a mechanical release mechanism nor a change over mechanism. Further, not only in the bulb photographing mode but also in the normal photographing mode the release operation of the camera can be carried out electromagnetically, so that it is possible to always carry out the release operation with the same operating feel. Further, when the bulb photographing mode is set, the exposure display meter is short-circuited so that misoperation due to presence of the display can be avoided.

What is claimed is:

1. Bulb photography control system for a camera comprising:
    a shutter opening member for actuating a shutter opening operation;
    a shutter closing member for actuating a shutter closing operation;
    a first holding member for holding the shutter opening member so as to check the shutter opening operation;
    a first magnet operatively arranged with the first holding member for releasing the first holding member from holding the shutter opening member;
    a second holding member for holding the shutter closing member so as to check the shutter closing operation;
    a second magnet operatively arranged with the second holding member for releasing the second holding member from holding the shutter closing member;
    a first circuit to which the first magnet is connected for supplying current to the control system from a power source;
    a second circuit connected to the first circuit for controlling the second magnet;
    first switch means arranged to be changed over into a first state wherein the first circuit and the second circuit are supplied with current and a second state wherein the first and the second circuits are not supplied with current, said first switch means being arranged to change from the first state into the second state after the shutter opening member is operated;
    second switch means arranged to be changed over into a first state wherein the first circuit and the second circuit are supplied with current and a second state wherein the first and the second circuits are not supplied with current;
    a movable control member operatively coupled to the second holding member and arranged to be movable between a position at which the operation of the shutter closing member is checked by the second holding member and a position at which the shutter closing member operation is not checked; and
    a release member for moving the movable member between the position at which the operation of the shutter closing member is checked and the position at which the shutter closing member operation is not checked, said release member being arranged to simultaneously move the movable member into the position at which the operation of the shutter closing member is checked and change over the second switch means out of its first state into its second state in accordance with the actuation of the release member when bulb photographing operation is selected.

2. A camera in accordance with claim 1, including a switching circuit, wherein the first circuit and the second circuit are arranged to be supplied with current from the power source through the switching circuit, the switching circuit being brought into a switched on state when at least one of the first and the second switch means is in its first state.

3. A camera in accordance with claim 2, wherein the switching circuit includes a transistor.

4. A camera in accordance with claim 1, wherein the movable member is moved in accordance with movement of the release member between an actuated position at which the operation of the shutter closing member is checked and an initial position at which the operation of the shutter closing member is not checked, and including means for returning the release member to its initial position.

5. A camera in accordance with claim 4, wherein the first circuit includes third switch means coupled to the first magnet and operatively arranged with the release member wherein the third switch means is switched over into a state in which the first magnet releases the first holding member in accordance with movement of the release member.

6. A camera in accordance with claim 1, further comprising:
    an exposure display circuit which is arranged to be brought into an operative state when the second switch means is in its first state, and a non-operative state when the second switch means is in its second state.

* * * * *